United States Patent
Barlas

(10) Patent No.: US 9,637,275 B2
(45) Date of Patent: *May 2, 2017

(54) REUSABLE SHIPPING CONTAINER WITH INTEGRATED CONTENT PROTECTION

(71) Applicant: Reusable Solutions Group, Inc., Santa Cruz, CA (US)

(72) Inventor: Mitchell E. Barlas, Santa Cruz, CA (US)

(73) Assignee: REUSABLE SOLUTIONS GROUP, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,218

(22) Filed: Oct. 20, 2015

(65) Prior Publication Data

US 2016/0039574 A1 Feb. 11, 2016

Related U.S. Application Data

(63) Continuation-in-part of application No. 14/611,137, filed on Jan. 30, 2015, now Pat. No. 9,302,819.

(60) Provisional application No. 61/933,730, filed on Jan. 30, 2014.

(51) Int. Cl.

| | |
|---|---|
| *B65D 27/06* | (2006.01) |
| *B65D 77/26* | (2006.01) |
| *B65D 33/00* | (2006.01) |
| *B65D 75/54* | (2006.01) |
| *B65D 30/00* | (2006.01) |
| *B65D 81/05* | (2006.01) |

(52) U.S. Cl.
CPC ............. *B65D 27/06* (2013.01); *B65D 29/00* (2013.01); *B65D 75/545* (2013.01); *B65D 81/052* (2013.01); *B65D 2313/02* (2013.01); *B65D 2313/04* (2013.01); *Y02W 30/807* (2015.05)

(58) Field of Classification Search
CPC ................................ B65D 27/06; B65D 29/00
USPC .......... 229/301, 303, 305; 383/2, 4; 283/116, 283/81
See application file for complete search history.

(56) References Cited

U.S. PATENT DOCUMENTS

| | | |
|---|---|---|
| 3,889,743 A | 6/1975 | Presnick |
| 3,987,736 A | 10/1976 | Miller |
| 3,989,080 A | 11/1976 | Koszegi |

(Continued)

OTHER PUBLICATIONS

Office Action dated Jun. 3, 2015 for U.S. Appl. No. 14/611,137.

(Continued)

*Primary Examiner* — Christopher Demeree
(74) *Attorney, Agent, or Firm* — Daylight Law, P.C.

(57) ABSTRACT

A two-way reusable shipping container has a plurality of flexible walls, the walls surrounding an internal cavity when the shipping container is in an open state. A pouch is located on a first wall of the plurality of flexible walls, and is configured to form a pocket into which the walls of the shipping container are collapsed when the shipping container is in a compact state. A closure device is configured to retain the shipping container in the pocket in the compact state. In some embodiments, the shipping container includes inflatable pillows, each pillow being secured to one of the walls. In some embodiments, the pouch inverts when the shipping container is converted between the open and compact states, such that interior surfaces of the pocket when the shipping container is in the open state become exterior surfaces of the pocket when the shipping container is in the compact state.

22 Claims, 13 Drawing Sheets

(56) References Cited

U.S. PATENT DOCUMENTS

| | | |
|---|---|---|
| 4,905,835 A | 3/1990 | Pivert et al. |
| 5,180,060 A | 1/1993 | Forti et al. |
| 5,228,574 A | 7/1993 | Rogers |
| 5,272,856 A | 12/1993 | Pharo |
| 5,275,290 A | 1/1994 | Bierfreund |
| 5,372,429 A | 12/1994 | Beaver et al. |
| 5,624,035 A | 4/1997 | Kim |
| 5,769,232 A | 6/1998 | Cash et al. |
| 5,967,390 A | 10/1999 | Goryl |
| 6,334,537 B1 | 1/2002 | Tepper |
| 6,607,122 B1 | 8/2003 | Ong |
| 7,168,567 B2 | 1/2007 | Peper et al. |
| 7,383,953 B2 | 6/2008 | Dickinson |
| 7,735,643 B2 | 6/2010 | Sanches et al. |
| 7,789,604 B2 | 9/2010 | Rotche |
| 7,909,234 B2 | 3/2011 | Maistrellis |
| 8,047,378 B2 | 11/2011 | Eskenazi et al. |
| 8,235,206 B2 | 8/2012 | Siegel et al. |
| 8,287,188 B2 | 10/2012 | Hoyord et al. |
| 8,672,546 B2 | 3/2014 | Jariwala et al. |
| 8,985,432 B2 | 3/2015 | Cullen et al. |
| 9,045,271 B2 | 6/2015 | Matheison et al. |
| 2002/0185403 A1 | 12/2002 | Russo |
| 2003/0021923 A1 | 1/2003 | Russo |
| 2005/0061409 A1 | 3/2005 | Chung |
| 2006/0131202 A1 | 6/2006 | Kramer |
| 2006/0207849 A1 | 9/2006 | Sadow |
| 2008/0099365 A1 | 5/2008 | Chiozza et al. |
| 2009/0166238 A1 | 7/2009 | Dickinson |
| 2009/0266722 A1 | 10/2009 | Rogers et al. |
| 2010/0314438 A1 | 12/2010 | Hines |
| 2011/0155794 A1 | 6/2011 | Russell |
| 2013/0026052 A1 | 1/2013 | Tompkins |
| 2013/0037538 A1 | 2/2013 | Dahlquist |
| 2015/0210433 A1 | 7/2015 | Barlas |

OTHER PUBLICATIONS

Office Action dated Oct. 14, 2015 for U.S. Appl. No. 14/611,137.

Notice of Allowance dated Feb. 8, 2016 for U.S. Appl. No. 14/611,137.

Office Action dated Dec. 23, 2015 for U.S. Appl. No. 14/611,137.

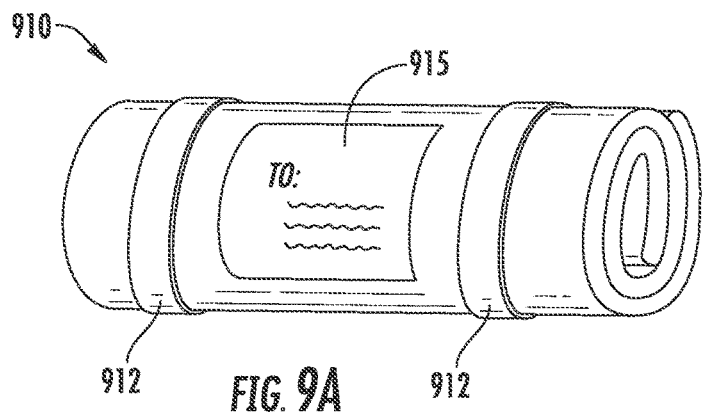
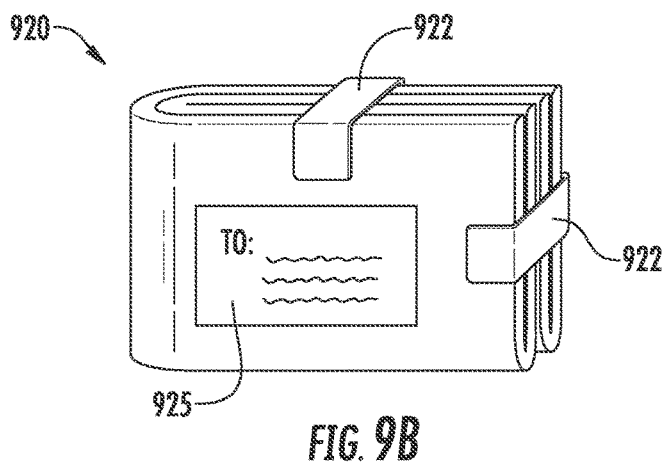
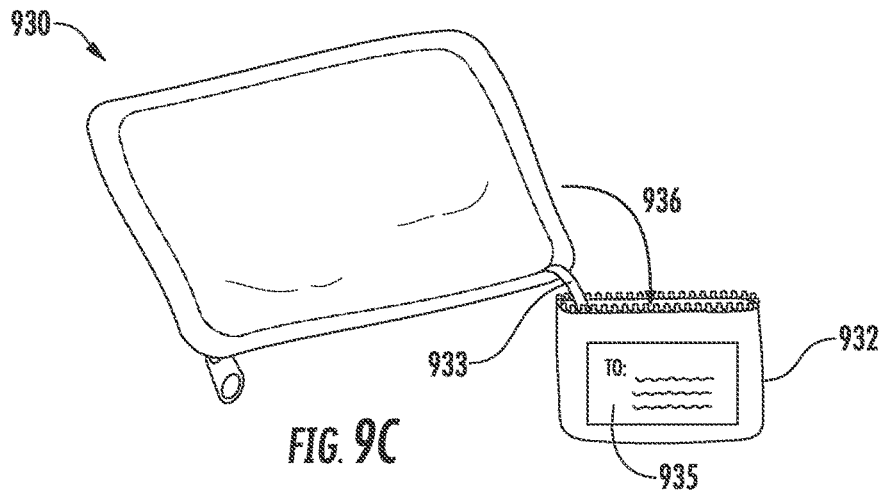

REUSABLE SHIPPING CONTAINER WITH INTEGRATED CONTENT PROTECTION

RELATED APPLICATIONS

This application is a continuation-in-part of U.S. patent application Ser. No. 14/611,137 filed on Jan. 30, 2015, entitled "Reusable Two-Way Self-Mailing Bag" and published as U.S. Patent Publication No. 2015/0210433; which claims the benefit of U.S. Provisional Patent Application No. 61/933,730, filed on Jan. 30, 2014; all of which are incorporated by reference herein in their entirety.

BACKGROUND OF THE INVENTION

The use of disposable plastic bags is decreasing. Due to the environmental impact—as well as the economic impact—of a single-use product, reusable bags are becoming more commonplace. Reusable packaging for the shipping of products also has grown, due to increased environmental awareness and an increase in online commerce. Reusable shipping containers known in the art include boxes or crates with rigid wall panels that can be folded or detached into a collapsed state. These containers are made of typically wood, metal, or hard plastics that provide the structure of the container. Other types of reusable packaging are soft-sided pouches that utilize an inflatable structure or a thick protective lining to cushion the article being shipped. As consumers become increasingly educated on ecological issues, the need for environmentally-friendly shipping options continues to grow.

SUMMARY

In some embodiments, a two-way reusable shipping container has a plurality of flexible walls, the walls surrounding an internal cavity when the shipping container is in an open state. The shipping container includes a first closure device that is capable of closing the internal cavity, and a shipping label pouch located on a first wall of the plurality of flexible walls. The pouch has a label area configured to accommodate a shipping label, where the pouch is configured to form a pocket into which the walls of the shipping container are collapsed when the shipping container is in a compact state. A second closure device is coupled to the shipping label pouch, the second closure device being configured to retain the shipping container in the pocket in the compact state. The label area is visible when the shipping container is in the open state and in the compact state, without opening either the first closure device or the second closure device.

In some embodiments, a reusable shipping container has a plurality of flexible walls, the walls surrounding an internal cavity when the shipping container is in an open state. The shipping container includes a plurality of inflatable pillows, each pillow being secured to one of the walls. Each pillow has an inflated state that provides structural rigidity to the shipping container in the open state. A shipping label pouch is located on a first wall of the plurality of flexible walls, the pouch having a label area configured to accommodate a shipping label. The pouch is configured to form a pocket into which the walls of the shipping container are collapsed when the shipping container is in a compact state. A closure device is configured to retain the shipping container in the pocket in the compact state. The label area is visible when the shipping container is in the open state and in the compact state, without opening either the first closure device or the second closure device.

In some embodiments, a reusable shipping container has a plurality of flexible walls, the walls surrounding an internal cavity when the shipping container is in an open state; and a plurality of inflatable pillows, each pillow being secured to one of the walls. A pouch is located on a first wall of the plurality of flexible walls, the pouch being configured to form a pocket into which the walls of the shipping container are collapsed when the shipping container is in a compact state. A closure device is coupled to the pouch, the closure device being configured to retain the shipping container in the pocket in the compact state. The pouch inverts when the shipping container is converted between the open state and the compact state, such that interior surfaces of the pocket when the shipping container is in the open state become exterior surfaces of the pocket when the shipping container is in the compact state.

These and other aspects will become apparent from the following description taken in conjunction with the following drawings, although variations and modifications may be effected without departing from the scope of the disclosure.

BRIEF DESCRIPTION OF DRAWINGS

The embodiments can be more fully understood by reading the following detailed description together with the accompanying drawings, in which like reference indicators are used to designate like elements. The accompanying figures depict certain illustrative embodiments and may aid in understanding the following detailed description. Before any is explained in detail, it is to be understood that the disclosure is not limited in its application to the details of construction and the arrangements of components set forth in the following description or illustrated in the drawings. The embodiments depicted are to be understood as exemplary and in no way limiting of the overall scope. Also, it is to be understood that the phraseology and terminology used herein is for the purpose of description and should not be regarded as limiting. The detailed description will make reference to the following figures.

FIGS. 9A-9C are front views of alternative embodiments for compacting a shipping container.

Figure 1:
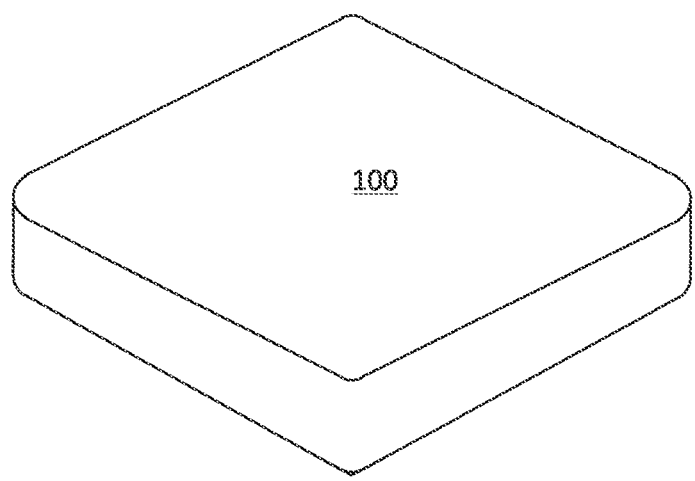
FIG. 1 illustrates a back view of an embodiment in which the two-way self-mailing bag is in a folded position.

Before any embodiment is explained in detail, it is to be understood that the present disclosure is not limited in its application to the details of construction and the arrangements of components set forth in the following description or illustrated in the drawings. The embodiments are capable of being practiced or being carried out in various ways. Also, it is to be understood that the phraseology and terminology used herein is for the purpose of description and should not be regarded as limiting.

DETAILED DESCRIPTION OF THE EMBODIMENTS

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the scope of the claimed invention. Descriptions of well-known functions and constructions are omitted for clarity and conciseness. Moreover, as used herein, the singular may be interpreted in the plural, and alternately, any term in the plural may be interpreted to be in the singular.

The disclosure includes the description of a reusable mailing container or bag that includes specific portions for the insertion of mailing labels. In some embodiments, a reusable two-way mailing container includes one or more portions for the insertion or receipt of one or more mailing labels. This disclosure also includes the description of a self-mailing container, which can be folded into itself appropriately for mailing. The container is self-mailing in that it may include a pouch into which the container may be compacted, thereby not requiring any additional envelope or packaging for mailing it in the compacted state. It is a two-way shipping container in the sense that the container may be mailed to a recipient in a compact—such as folded—state, opened, filled by the recipient and returned in an opened, filled state; or vice versa where the container is mailed in a filled state and returned in a compressed state. In some embodiments, the reusable shipping container can include integrated content protection, such as inflatable pillows secured to one or more walls of the shipping container. In this disclosure, general reference to a shipping container may refer to an envelope, bag, box or other type of package for mailing items.

In order to effectuate mailing, the bag may include one or more pouches configured to receive shipping labels. In accordance with some embodiments, the bag may include a single pouch that is viewable from either side of the bag, thereby allowing the bag to receive a label for mailing either, or both, to and from the recipient. In accordance with some embodiments, the bag may include a pouch that can be accessed from either side of the bag, or may comprise two or more pouches that may be proximate to each other, or at different locations in the bag.

The bag may be closed by any suitable means, including but not limited to a zipper, channel, zip-lock style closure, hook and loop closure, adhesive closure, mechanical closure, etc. In order to maintain the bag in a closed position for mailing, an additional device, such as but not limited to a mechanical security band may be used.

The present embodiments may be used for any variety of purposes, including but not limited to, the shipment of new or used goods, and shipments that are sent to and from a party (such as, but not limited to, business documents). For example, a company that recycles electronic devices may send a bag to a customer in a folded state, and receive the bag filled with electronics for donation. The bag may be prepared with a return label (for example, pre-paid by the company) so that a customer may receive the bag, unfold it from the pouch and turn it inside-out, to expose a prepaid label already positioned in a pouch for return mailing.

With reference to FIG. 1, an exemplary two-way mailing bag 100, in accordance with some embodiments, is depicted in a folded state. It can be seen that the two-way mailing bag is prepared for mailing in a folded position. In practice, this may be used, for example, to provide a mailing bag to a user in order to return, sell, or otherwise ship a product or item. In alternative practices, the two-way mailer may be sent to a user full of items, documents, products, etc., and may be folded into a folded position for return.

Figure 2:
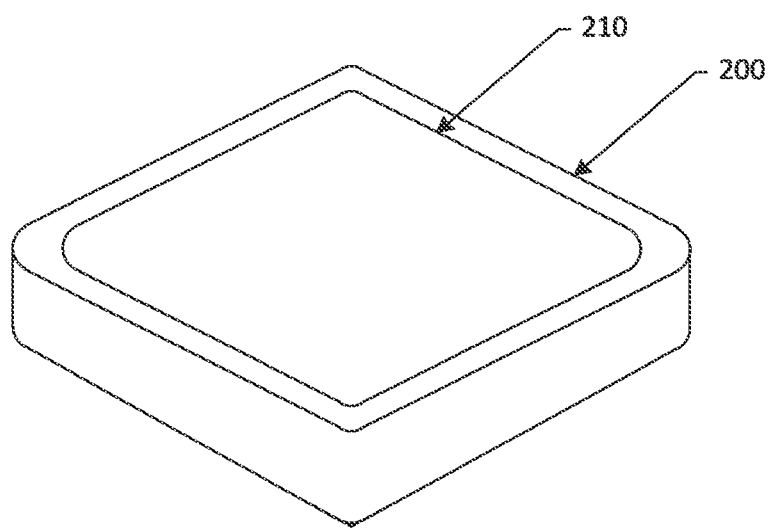
FIG. 2 illustrates a front view of an embodiment in which the two-way self-mailing bag is in a folded position, depicting one side of the two way mailing pouch that may receive a shipping label.

With reference to FIG. 2, an exemplary two-way mailing bag 200 in accordance with some embodiments is depicted. Two-way mailing bag 200 is in a folded position, with a pouch 210 visible. Pouch 210 may be configured to receive shipping or postage labels or applications.

Figure 3:
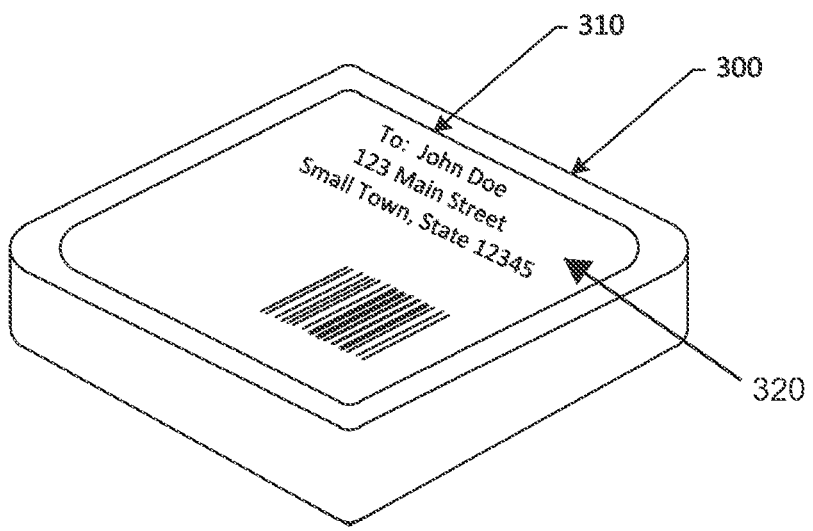
FIG. 3 depicts a front view of an embodiment in which the two-way self-mailing bag is in a folded position, depicting a shipping label in one side of the mailing label pouch.

With reference to FIG. 3, an exemplary two-way mailing bag 300 in accordance with some embodiments is depicted. Bag 300 may comprise a pouch 310, into which a mailing label 320 (for shipping addresses and/or postage) may be inserted. Note that this mailing label is generally for the first shipment of the two-way mailing bag—to the user.

Figure 4:
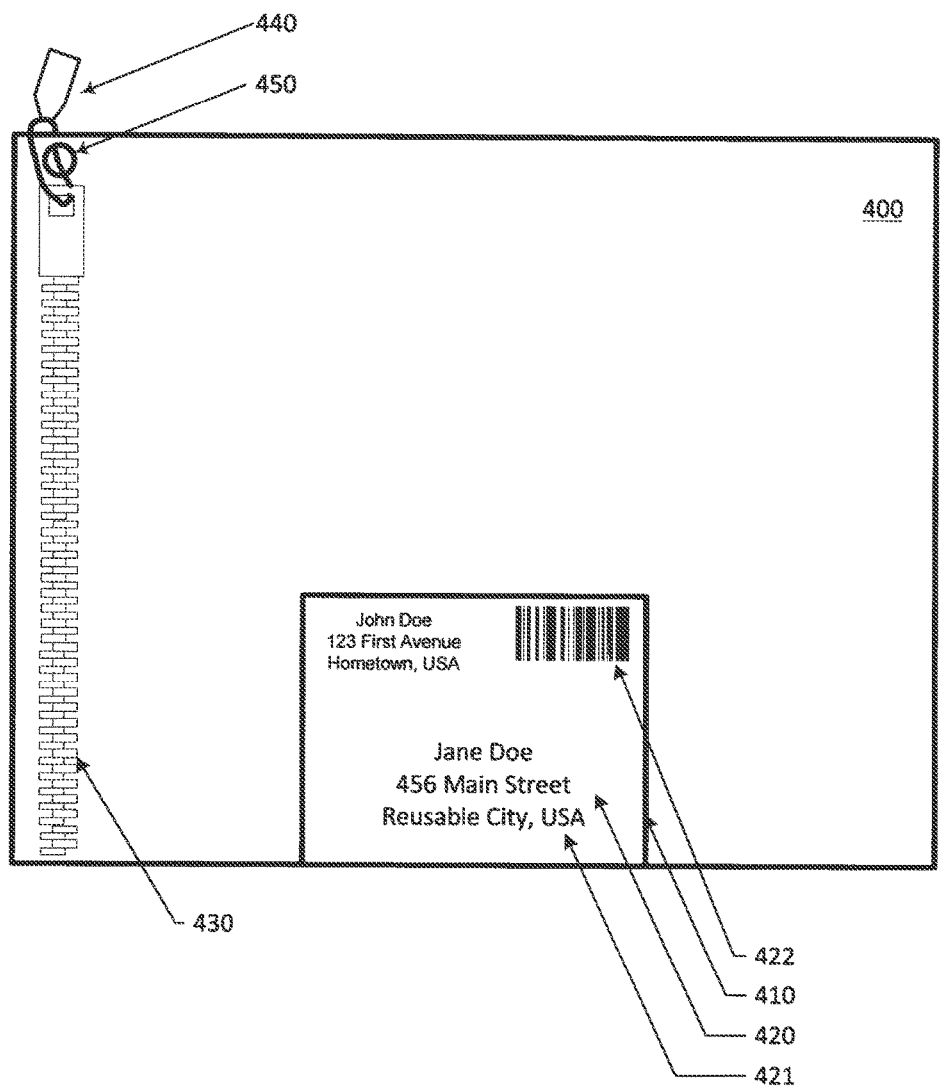
FIG. 4 illustrates an exemplary two way self-mailing bag in accordance with some embodiments, in an open position, illustrating a zipper, mailing label, etc.

FIG. 4 illustrates an exemplary two-way mailing bag 400 in an open (non-folded) position. Note that the proportions of the two-way mailing bag 400 in comparison to the mailing label, folded state, zipper, or any other item is not to be seen as limiting. Two-way mailing bag 400 may comprise a pouch 410, into which a shipping or postage label 420 may be inserted. Postage label may be preaddressed 421 and may optionally include an indicia of prepaid postage 422. The two-way mailer bag 400 may comprise a zipper 430 for closing the bag, although it is contemplated that various other mechanisms may be utilized for closing the bag (such as but not limited to, hook-and-loop connections, snaps, magnets, laces, and/or any other type of mechanical connection). In order to prevent the bag 400 from opening during use, a locking tab or device 440 may be utilized. The locking tab or device 440 may engage the zipper or other closing device 430 while also engaging the two-way mailer bag 400, for example through the use of an optional hole 450 to engage the tab or device 440.

In accordance with some embodiments, the two-way mailer bag may be sent to a user in a folded position, but with a return label and/or postage already inserted into the pouch. In accordance with some embodiments, the pouch opens both ways, from a front side and a back side, so that it can be utilized in both the folded position and in the open position. In other words, a label directing the bag to the user may be placed back-to-back in the pouch with a label directing return of the pouch. Accordingly, a user need only open the folded mailer bag, fill it with items, secure the opening and ship the bag. Thus, the shipping label pouch is visible without looking into the internal cavity of bag 400, either when the two-way mailing bag is folded into the pocket or when the two-way mailing bag is unfolded.

Figure 5:
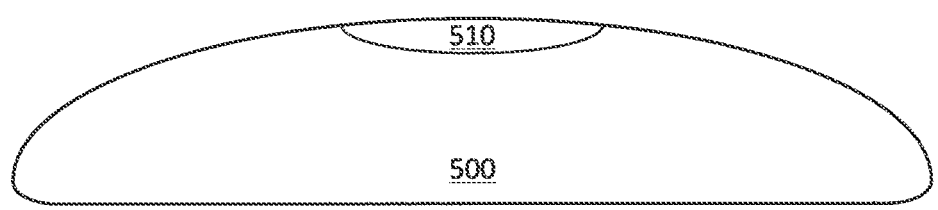
FIG. 5 depicts an embodiment in which the two-way self-mailing bag is in an open position, showing an internal pouch into which, in accordance with some embodiments, the mailing bag may be folded during mailing.

With reference to FIG. 5, it can be seen that in accordance with some embodiments, when a two-way mailing bag 500 is in an open or unfolded state, an internal pocket 510 may be seen. Internal pocket 510 may be used such that the unused mailing bag may be folded into internal pocket 510 in order to be shipped or mailed in a folded state. During use in an unfolded or open state, the internal pocket 510 may be superfluous, and not impact the functionality of the mailing bag.

Figure 6:
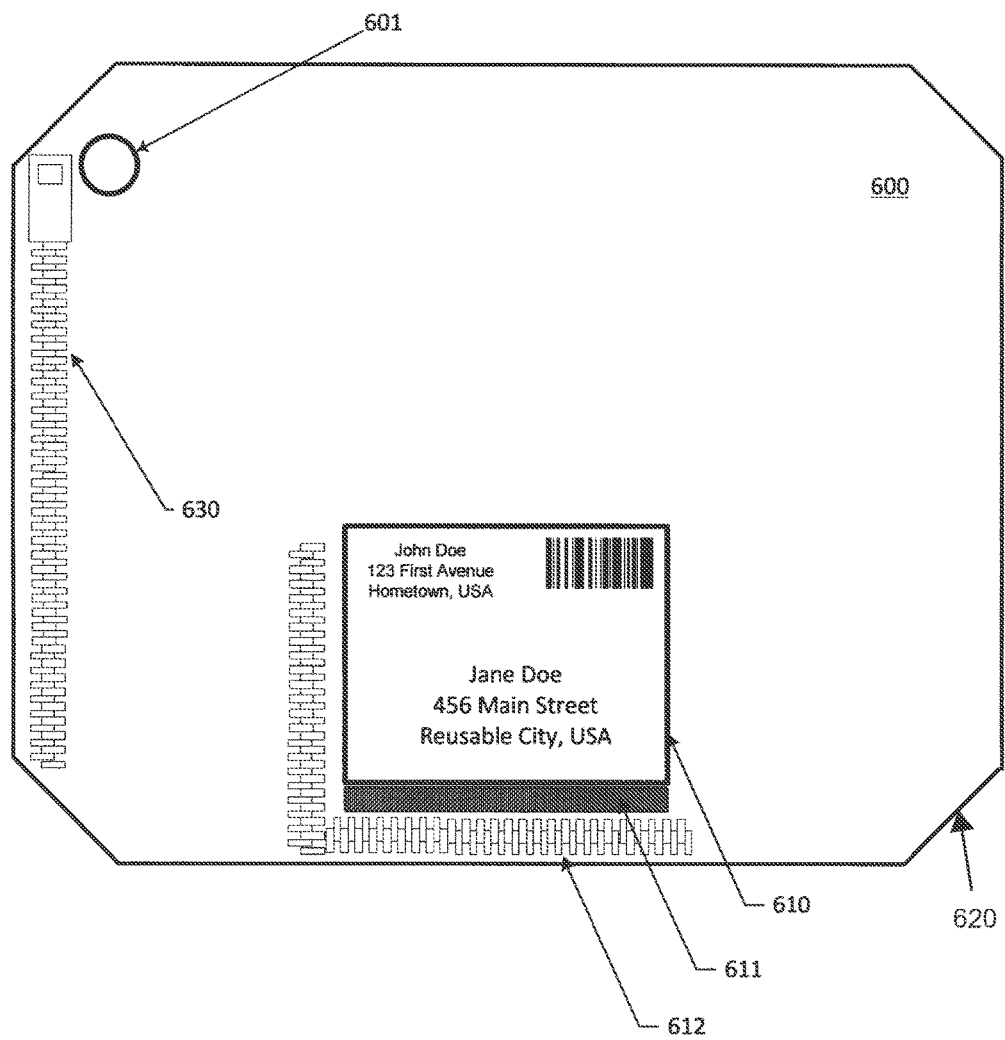
FIG. 6 illustrates an exemplary two way self-mailing bag in accordance with some embodiments, in an open position, illustrating a zipper, mailing label, etc.

With reference to FIG. 6, an exemplary two-way mailing bag 600 in accordance with some embodiments will now be discussed. Two-way mailing bag 600 may be formed from any suitable material, though it is contemplated that environmentally friendly material, such as pack cloth may be utilized. However, it is contemplated that any other material such as, but not limited to, nylon, cotton, canvas, jute, hemp, nonwoven materials such as but not limited to polypropylene), polyester, polyethylene terephthalate (PET), and/or recycled PET. The two-way mailing bag 600 may be treated with various coatings, such as but not limited to Microban, and/or additional coatings to impact the functionality or performance of the mailing bag (for example, by treating the bag to become hydrophobic or otherwise water resistant or waterproof). The bag may be formed from any suitable process (sewing, adhesive, etc.). In accordance with some embodiments the bag may be sewn using a double-stitch seam with a top-stitch overlap technique.

In general, mailing bag 600 may comprise a pocket 610 for receiving a shipping or postage label. Pocket 610 may be formed, for example, from clean vinyl polyvinyl chloride (PVC), or any other suitable material. The pocket 610 may be sized to receive a shipping label. The pocket 610 may comprise a closing mechanism such as hook-and-loop closures 611, that may be opened and reclosed once a shipping or postage label has been inserted.

Bordering the pocket 610 may run another closure or attachment device 612, such as but not limited to a zipper, such as a double-headed or wrap-around zipper 612. Closure device 612 may be used to hold the two-way mailing bag 600 in a closed or folded state, and may be opened to allow the two-way mailing bag 600 to unfold into its open state. In some embodiments, the attachment device 612 may include snaps, magnets, or a hook-and-loop closure.

In order to assist with folding the two-way mailing bag 600 into its internal pouch, the bag 600 may be shaped without full corners 620. In this manner, the folding of the bag 600 into a pouch (not shown) that is adjacent to the pocket 610 may be more easily accomplished.

In order to access an internal cavity of the two-way mailing bag 600, a zipper or other closure device 630 may be utilized. As with the embodiment discussed above with regard to FIG. 4, a tab or other locking device (not pictured) may be utilized to hold the zipper in a closed position by engaging with opening 601. Opening 601 may comprise a metal grommet to prevent damage or deterioration of the mailing bag 600. Opening 601 may be utilized to store the bags in a hanging position, as well as engage a locking tab or device.

In accordance with various embodiments, a two-way reusable mailing bag is disclosed, which comprises a larger bag or pouch that folds into a pocket, may be held into a folded position with an attachment device, and placed in the mail or for shipment. A pocket for a mailing label may be included in both a folded and an open position. This may comprise two-pockets, or may comprise a double-sided pocket that may be accessed when the mailing bag is in either a folded or open position.

Figure 7:
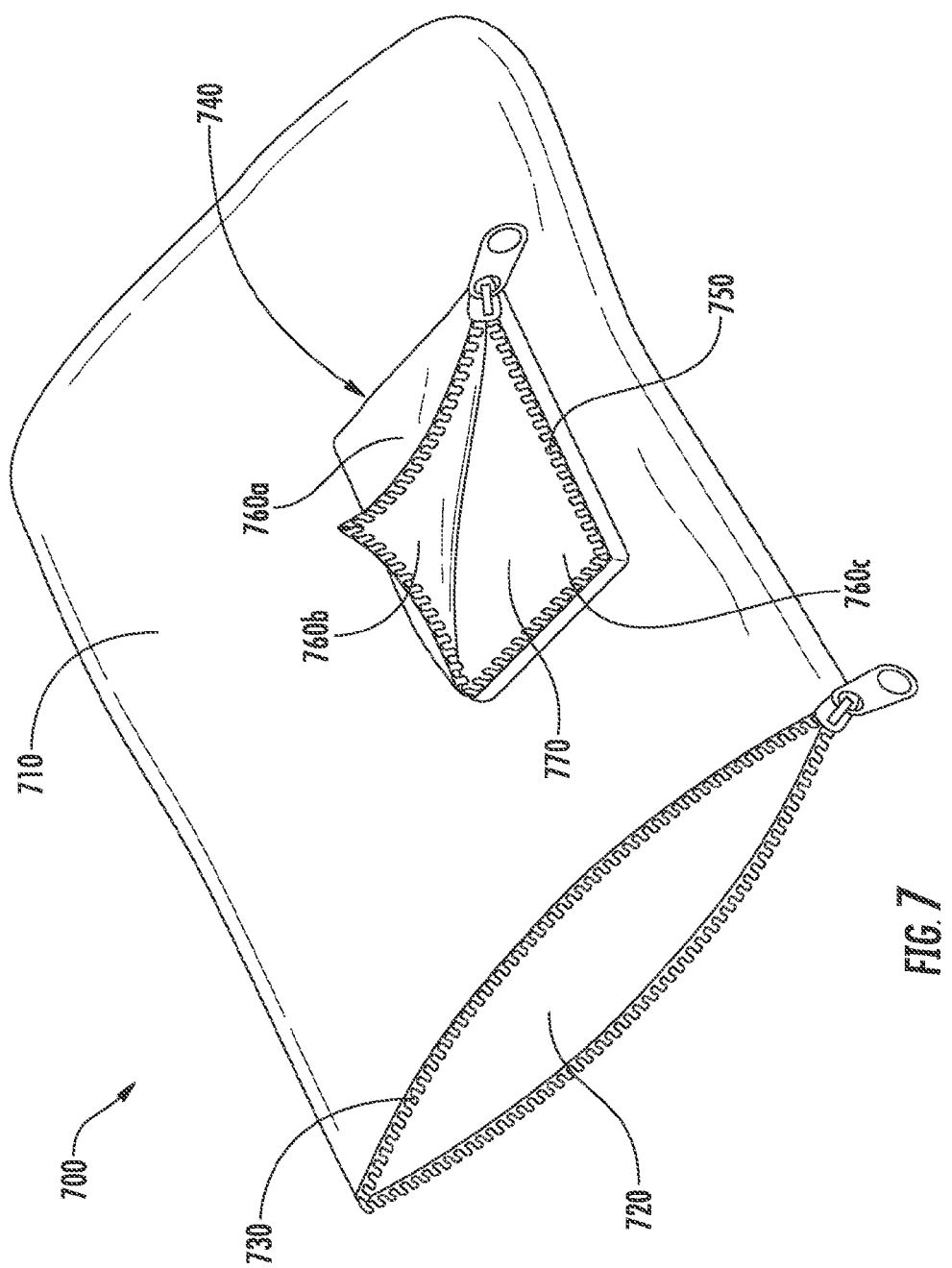
FIG. 7 illustrates a perspective view of a shipping container with a pouch into which the shipping container may be collapsed, in accordance with some embodiments.

FIG. 7 shows another embodiment of a two-way reusable shipping container 700, illustrated as a mailing bag in this embodiment. Shipping container 700 has a first wall 710 and a second wall (wall 715 on the underside of the container 700, visible in FIG. 8B), which surround an internal cavity 720 when the container 700 is in an open state as shown in FIG. 7. In the open state, the internal cavity 720 provides a space to hold an object to be shipped. The walls of the shipping container 700 are flexible, so that the container may be compressed for mailing it in a compact state when no items are being shipped in internal cavity 720. The wall 710 (and underside wall 715) may be made of, for example, fabrics, plastics, composites, or any other flexible material. A first closure device 730 is at one edge of the container 700 in this embodiment, which closes the internal cavity 720 so that items within internal cavity 720 can be safely stored for shipping. Closure device 730 is illustrated as a zipper, but may take the form of other devices such as hook-and-loop materials, magnets, snaps, laces, straps, sealing strips, adhesives, buttons, plastic or metal hooks, and the like.

A shipping label pouch 740 is located on wall 710. The location of pouch 740 is illustrated as being on a central portion of the bag and offset to one side, corresponding to the location of standard address labels. However, the pouch 740 may be positioned at other locations on the bag, in other embodiments. Indeed, one benefit of certain approaches disclosed herein is that the bag can be easily compacted into its folded state regardless of where shipping label pouch 740 is placed on wall 710 as will be apparent to those of ordinary skill upon obtaining an understanding of the teachings herein. A second closure device 750 is located at one or more edges of shipping label pouch 740, where the pouch is shown as partially open in FIG. 7. Similar to the first closure device 730, the second closure device 750 for pouch 740 is illustrated as a zipper but may instead take the form of other types of fastening devices. Additionally, the closure device 750 may be coupled to the pouch 740 at locations other than at an edge of the pouch 740. For example, the second closure device 750 may be a strap or lace that is attached anywhere on the surface of the pouch.

Shipping label pouch 740 has a label area 760 to accommodate a shipping label, where any of the embodied label areas 760a, 760b, or 760c may generally be referred to as label area 760 in this disclosure for simplicity. In one embodiment, the shipping label may be adhered to label area 760a on the front side wall of the pouch 740. In other embodiments, label area 760a may be a transparent sleeve (e.g., a clear polyvinylchloride (PVC) window), where the shipping label is placed inside the sleeve. A transparent sleeve may enable a second shipping label, such as a return or forwarding label, to be placed inside the sleeve, facing label area 760b, where area 760b is at the backside of label area 760a. Label area 760c is yet another embodiment of a label area on the opposite side wall of the pouch 740 as label area 760a/b. Label area 760c may serve as an area to which a return or other shipping label may be mounted. In various embodiments, the label area 760c may be an opaque material that includes a coating or a material to promote adherence of a label or sticker. In some embodiments, the coating or material may also be chosen to enable repeated removal and adherence of shipping labels, so that the shipping container can be reused multiple times. Thus, in these various embodiments of label areas 760a, 760b and 760c, both inbound and outbound labels may be placed on or in the pouch 740 prior to the outbound shipment, so that the recipient can easily mail the container to its next destination. Different labels can be placed on different label areas such that they appear and are visible in the compact and open state. For example, the outbound label could be placed in label area 760a while the return label is placed in label area 760b or 760c, and vice versa. Furthermore, label area 760c can be a transparent sleeve as described above and label area 760a/b can be an area of opaque material as described above. In further embodiments, the pouch 740 may have multiple label areas on a single surface. For example, label area 760a could be configured as two separate windows instead of one general label area. The two windows could serve as a primary window for the recipient's address and a secondary window for the sender's address.

Pouch 740 is configured to form a pocket into which the walls of the shipping container are collapsed when the shipping container is in a compact state. The dimensions of pouch 740 are thus designed not only to accommodate a shipping label, but also to be able to store the walls of the shipping container inside the pouch 740 in the compact state. In some embodiments, the pouch 740 is integrated with a selected wall in the plurality of flexible walls. For example, in FIG. 7 the label area 760c of pouch 740 may be the surface of the shipping container wall 710 itself. In other embodiments, a wall of the pouch 740 (e.g., the wall for label area 760c) may be integrated with the shipping container 700 by being sewn and/or adhered onto wall 710.

Figure 8A:
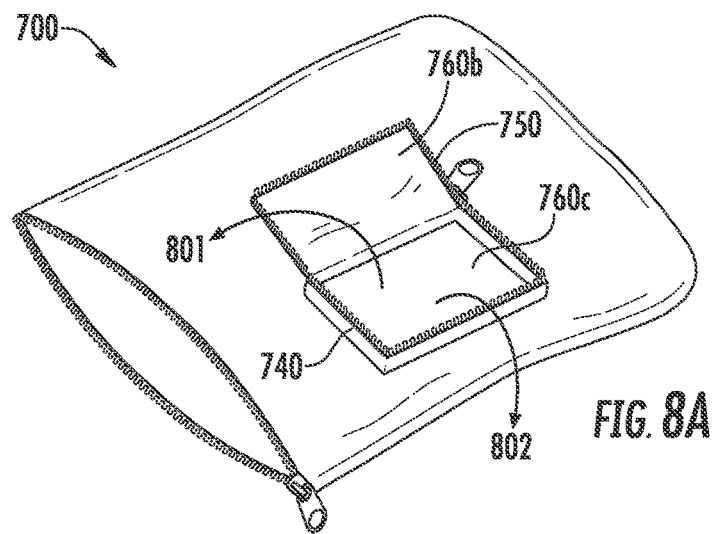
FIGS. 8A-8C illustrate perspective views of the shipping container of FIG. 7 in various stages of being converted from an open state to a compact state, in accordance with some embodiments.
Figure 8B:
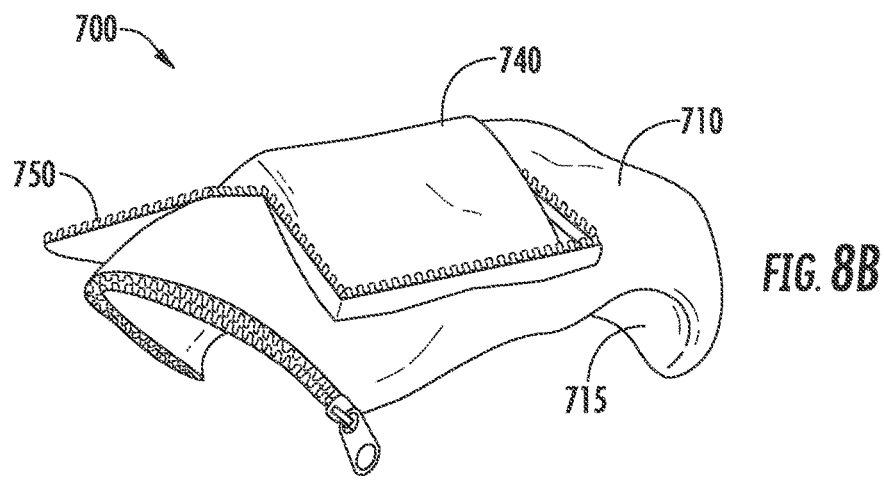
Figure 8C:
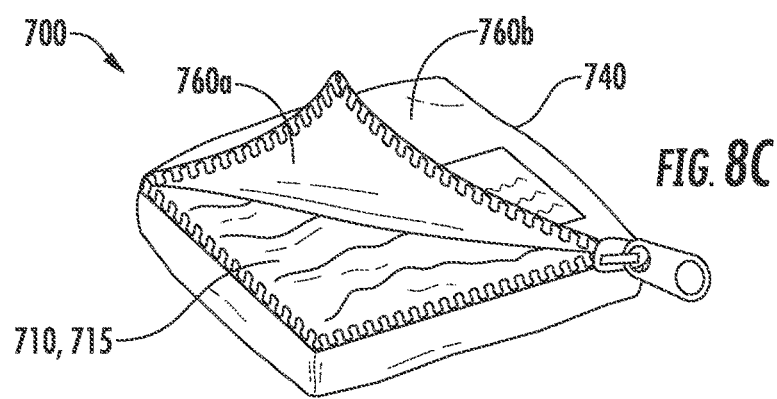

FIGS. 8A-8C show exemplary stages of converting the shipping container 700 from an open state, such as in FIGS. 7 and 8A, to a closed state, shown in FIG. 8C. In the embodiment of FIG. 8A, arrows 801 and 802 indicate that the conversion begins by turning the shipping label pouch 740 inside out, such that the interior surfaces of the pouch 740, such as label areas 760b and 760c, will become the exterior surfaces of a pocket into which the shipping container 700 itself will be stored. Thus, the shipping label pouch is configured to form a pocket by inverting, when the shipping container is converted between the open state and the compact state. FIG. 8B shows an intermediate stage in which the shipping container walls 710 and 715 are being collapsed as the pouch 740 is being inverted. FIGS. 8A and 8B show the zipper closure device 750 as extending along three edges of the rectangular pouch 740 in this embodiment, and for clarity of illustrating the conversion process. In other embodiments, the zipper may extend, for example, along only two edges as shown previously by closure device 612 in FIG. 6. The walls 710 and 715 may be compressed into the pouch by, for example, folding, rolling, crumpling, or a combination of these actions. In the compact state of FIG. 8C, the shipping container 700 has been compacted such that the internal cavity 720 is absent. The walls 710 and 715 have been compressed and stowed into the pocket formed by the reversed pouch 740, for shipping of the container itself in a compact size. The pouch 740 has been inverted such that label area 760b is now on the outside of the pouch 740. Thus in this embodiment, the label area 760 has a front side 760a that is visible when the shipping container 700 is in the open state, and a back side 760b that is visible when the shipping container 700 is in the compact state. The label area 760 embodied by one or more of label areas 760a, 760b and 760c is visible when the shipping container 700 is in the open state and in the compact state, without opening either the first closure device 730 or the second closure device 750 to view the shipping label.

The compact state of the shipping container may be useful in allowing, for example, a customer to return a mailing bag to a vendor, so that the vendor can reuse the container to send another shipment in the future. In another example, the shipping container 700 may be sent to a customer in the compact state so that the customer may use the container to return an article to the vendor. Note that the terms vendor and customer in this disclosure may also generally apply to any parties that are sending and receiving a package, such as friends or family mailing items to each other. In the compact state the reusable shipping container is self-contained, such that it can be sent in its compact state without requiring any additional packaging materials. The shipping container is enclosed within the pouch 740, and the second closure device 750 retains the shipping container 700 in the pocket space of pouch 740 in the compact state.

FIGS. 9A, 9B and 9C illustrate other embodiments of compacting a shipping container, but without storing it in the shipping label pouch. In FIG. 9A, a shipping container 910, such as an envelope, a bag, or a box, is rolled up and secured in the rolled configuration by straps 912. A shipping label pouch 915, that is integrated with shipping container 910, is visible in this compact shape and enables the container 910 to be easily mailed to its destination. In FIG. 9B, a shipping container 920 has been folded up and is maintained in the folded configuration with straps 922. The shipping container 920 is folded such that shipping label pouch 925 is visible in the folded state. In FIG. 9C, a shipping container 930 has a separate, non-integrated pouch 932 included with it. Shipping container 930 is shown inside-out, with the pouch 932 being connected to the container 930 by a tether 933. The shipping container 930 can be compacted into the pouch 932, which has a shipping label area 935 integrated on the pouch 932. The pouch 932 would be kept inside the shipping container 930 when the container 930 is being used to ship items.

Figure 10A:
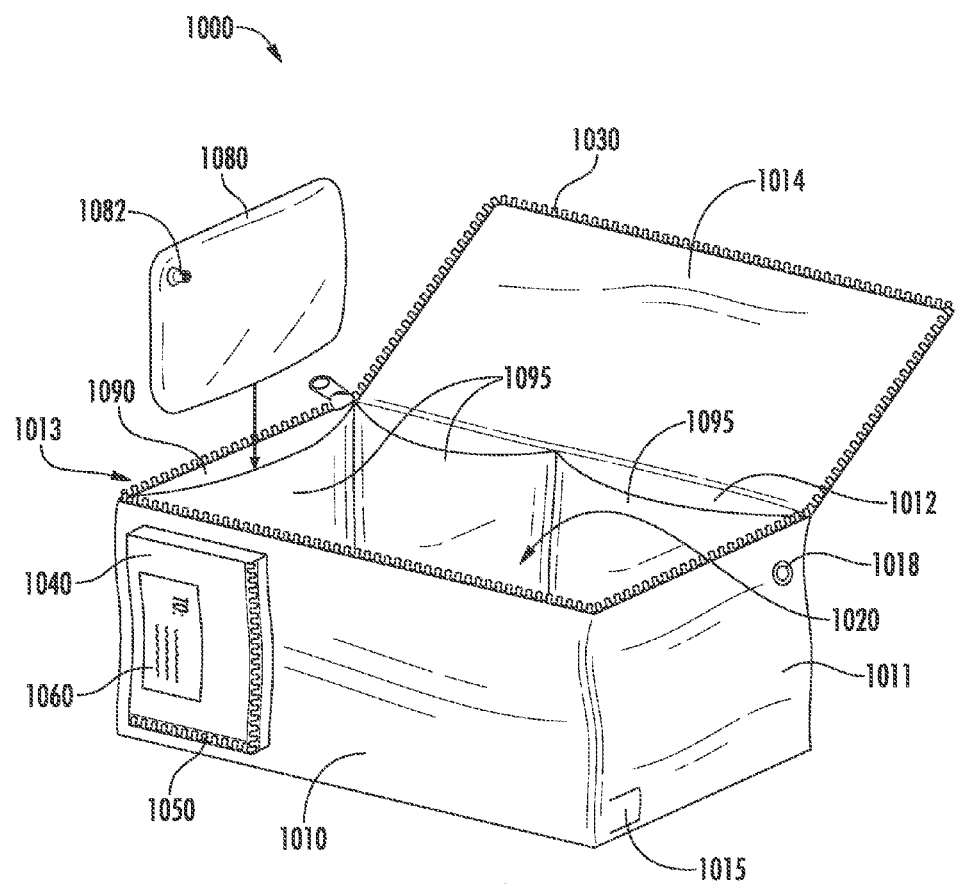
FIGS. 10A-10B illustrate perspective views of an open state and a compact state, respectively, of a shipping container with integrated content protection in accordance with some embodiments.

FIG. 10A shows another embodiment of a shipping container that is configured as a box 1000. The box 1000 is formed from a plurality walls, such as side walls 1010, 1011, 1012, 1013 and lid wall 1014, that surround an internal cavity 1020 when the box 1000 is in an open state as shown in FIG. 10A. Lid wall 1014 serves as a lid for the side walls, and a base wall (not shown) at the bottom of the box 1000 serves as a base. The walls of box 1000 are flexible so that they may be collapsed into a compacted form. The walls may be made of, for example, pack cloth, nylon, cotton, canvas, jute, hemp, nonwoven materials (such as but not limited to polypropylene), polyester, polyethylene terephthalate (PET), and/or recycled PET.

Box 1000 has a closure device 1030 that is positioned around three edges of the lid wall 1014 and the main body of box 1000 in this embodiment. As with closure device 730 of FIG. 7, closure device 1030 is illustrated as a zipper but may take the form of other types of fasteners and attachment mechanisms. Box 1000 also has pouch 1040, which is located on front side wall 1010 in this embodiment, but may also be located on any of the other walls of the box 1000, and at any location on those walls. Pouch 1040 has a closure device 1050 which enables opening and closing of the pouch 1040. A label area 1060 is located on pouch 1040, which accommodates the placement of a shipping label.

The shipping container of FIG. 10A also includes an inflatable pillow 1080 that is secured to wall 1013 of box 1000 and provides structural rigidity to the box 1000 when the pillow 1080 is inflated. The pillow 1080 also provides protection to the contents being shipped in box 1000. Although only one pillow 1080 is shown in FIG. 10A for clarity, a plurality of pillows may be used in conjunction with box 1000, where the pillows may be individually removed or replaced as needed, such as for repair. In the embodiment of FIG. 10A, the side walls 1010, 1011, 1012 and 1013 form a perimeter of the shipping container, where pillows 1080 are secured to the side walls. In some embodiments, inflatable pillows are also secured to the lid wall 1014 and base wall.

In the embodiment of FIG. 10A, the walls of box 1000 have an interior space 1090 formed by a panel 1095. The pillow 1080 is secured by being inserted into the interior space 1090, in either an inflated or deflated configuration. The panels 1095 of rear side wall 1012 demonstrate that multiple pillow compartments may be utilized for a single wall. For example, multiple pillows may be used for larger sized walls, or multiple pillow compartments may provide robustness to the shipping container in case one pillow of a wall becomes damaged and deflated during use. Valve 1082 on pillow 1080 enables air to be filled or removed from the pillow 1080. The box 1000 may include one or more access ports 1015 to allow a user to access an inflation valve, such as valve 1082. Access port 1015 may be, for example, a flap formed in wall 1011, or a cap or lid that may be opened. There may be more than one access port 1015, and the access ports may be accessible from either the inside or the outside surface of the box 1000 when it is in its open configuration. Box 1000 may optionally include a grommet 1018 that may be used as part of a security system for the shipping container. Similar to the locking device described in relation to FIG. 6, a locking feature may be utilized with, for example, the zipper pull of closure device 1030, to lock the zipper to grommet 1018 when the box 1000 has items stored in it for shipping.

Figure 10B:
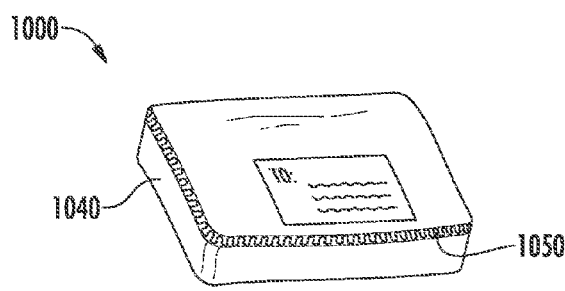

In operation, the box 1000 may be sent to a recipient with items packaged in the internal cavity 1020. The box 1000 is thus in an open state, with a pillow 1080 being inflated and secured by each panel 1095. Pillows 1080 may be inserted into each of the side walls 1010, 1011, 1012 and 1013, as well as the lid wall 1014 and base wall of box 1000. The label area 1060 displays the address of the recipient. After the recipient has accepted the shipment, they may mail the box to the sender, or to another party, for reuse. To do so, the customer first deflates the pillows 1080, which may remain within the wall spaces 1090. In other embodiments, the pillows 1080 may be removed. The closure device 1050 of pouch 1040 is opened and inverted in the manner depicted by FIGS. 8A-8C, so that the walls may be collapsed into the pocket formed by the reversed pouch 1040. In the embodiment of FIGS. 10A-10B, the closure device 1050 extends along only two edges of the pouch 1040. By having the closure device 1050 only able to open along two edges, the remaining two edges may facilitate formation of the pocket into which the box is being compressed, as the pouch 1040 is being turned inside out. The compact state of box 1000 is shown in FIG. 10B, where the body of the shipping container box 1000 is now stored inside the pouch 1040 and retained by closure device 1050. In some embodiments, the pillows are uninflated and are collapsed into the pocket with the walls of the shipping container. Thus, box 1000 with inflatable pillows 1080 uniquely has walls that are rigid in the open state, to store and protect items to be shipped, where the walls are collapsible to enable the box 1000 to be mailed in a compact form to another location for reuse. In other words, each pillow has an inflated state that provides structural rigidity to the shipping container in the open state, and an uninflated state enabling the pillow to be collapsed into the pocket when the shipping container is in the compact state. The compact form enables the container to be stored and mailed more conveniently and inexpensively than in its open state. The compact state may have dimensions similar to standard shipping envelopes. For example, the compressed shipping box 1000 in FIG. 10B may have dimensions of 10"×13"×1", 9"×12"×1", 6"×9"×½" or other dimensions that provide a convenient mailing size.

Figure 11A:
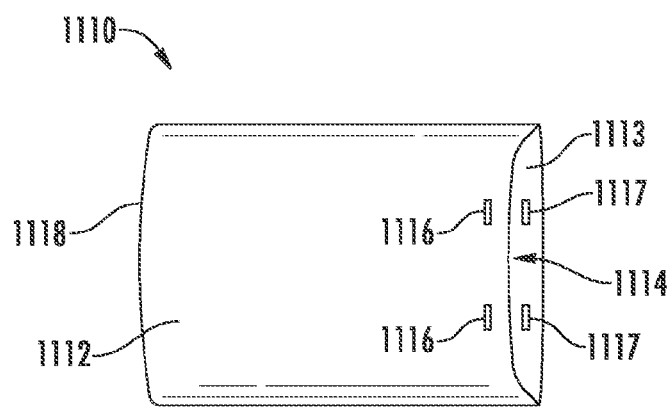
FIGS. 11A-11B illustrate front views of alternative embodiments for securing an inflatable pillow to a wall of a shipping container.
Figure 11B:
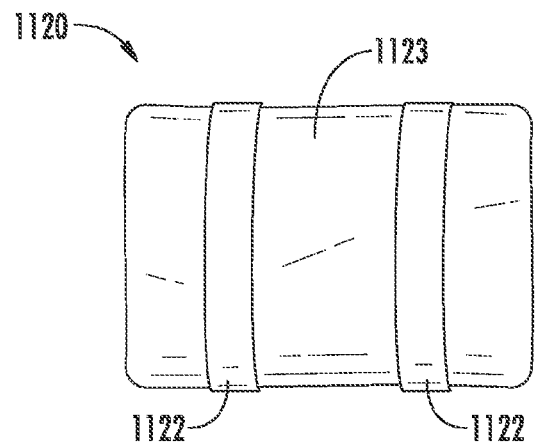

FIGS. 11A and 11B show embodiments of alternative embodiments for securing inflatable pillows to the walls of a shipping container. FIGS. 11A-11B each show only an individual wall, for clarity. In FIG. 11A, a wall 1110 has a front panel 1112 similar to the panel 1095 of FIG. 10A. The front panel 1112 and a back panel 1113 form an interior space 1114 within wall 1110 into which an inflatable pillow may be inserted, where the pillow is inserted from the side in this embodiment rather than from the top as in the embodiment of FIG. 10A. Locations 1116 and 1117 indicate where fasteners may be placed to help keep the pillows inside the walls. Fasteners can include, but are not limited to, buttons, hook-and-loop closures, straps, snaps and the like. For example, buttons may be located at locations 1117, with buttonholes at locations 1116. Although two locations are shown for each of 1116 and 1117, fasteners may be present at fewer or more locations. The interior space 1114 may be closed at the opposite end 1118 of wall 1110, or in other embodiments, the opposite end 1118 may be open and may also include fasteners. In some embodiments, the front panel 1112 may be made of an elastic material, such that tension provided by the front panel 1112 is able to secure a pillow without the use of any fasteners at locations 1116, 1117.

In FIG. 11B, a wall 1120 has straps 1122 for securing an inflatable pillow. Straps 1122 may be elastic, such that they stretch when a pillow is inserted between the straps 1122 and back wall 1123. In other embodiments, straps 1122 may be inelastic and may be tightened around a pillow as needed, using a bracket, clip, or the like to adjust the length of the straps 1122.

Figure 12:
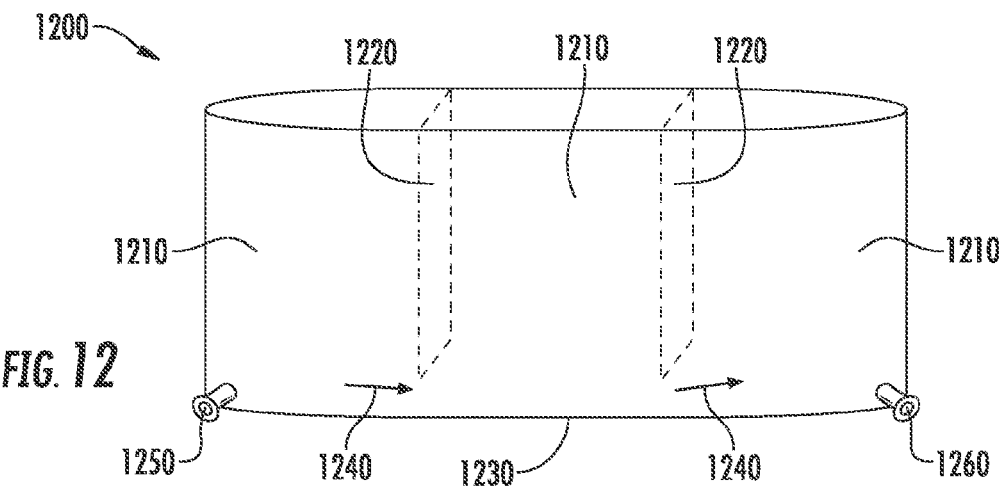
FIG. 12 illustrates a front perspective view of an inflatable pillow, in accordance with some embodiments.

FIG. 12 shows an embodiment of an inflatable pillow 1200. Note that the term pillow in this disclosure may represent any type of device that is able to have gas filled and removed from it, such as a bladder, chamber or cushion. Pillow 1200 is shown as approximately rectangular in shape, as could be used with the walls of box 1000 in FIG. 10A. Pillow 1200 has multiple chambers, shown as three sub-chambers 1210 in this embodiment, where the sub-chambers 1210 are created by ribs 1220 between them. The ribs 1220 may assist in providing structural shape to the pillow 1200, such as for pillows of larger dimensions. The ribs 1220 are shown in this embodiment to have a small gap from the bottom edge 1230 of pillow 1200, allowing the sub-chambers 1210 to be in fluid communication with each other within the inflatable pillow, as shown by arrows 1240. This gap allows the entire pillow to be inflated using one inflation port 1250. Inflation port 1250 may include a valve to prevent air from leaking out. Pillow 1200 also shows an optional second inflation port 1260 on the opposite end of pillow 1200, where the second inflation port 1260 may be used to connect pillow 1200 with another pillow in a shipping container. For example, two or more pillows, such as all pillows, in a shipping container could be interconnected, such that one access port (e.g. access port 1015 of FIG. 10A) can be used to inflate multiple pillows of the container. In such embodiments, inflation port 1250 may serve as a main inflation valve for a plurality of pillows that are in fluid communication with the main inflation valve. The other pillows of the shipping container may be in fluid communication with the main inflation valve through additional tubing or valves such as inflation port 1260. Thus in some embodiments, the inflation port 1260 may be a simple connecting tube. In yet other embodiments, each pillow is configured to be filled individually, without any interconnections with other pillows.

The inflation ports 1250 and 1260 are constructed with tubing that is flexible such that they can compress to a flattened or nearly flat state when the shipping container is converted to its compact state. If a valve is included, the valve may be a one-way valve that prevents air from leaving the pillow unless, for example, the valve is squeezed for deflating the pillow. The valve can also include a cap for additional sealing of air.

The inflatable pillows of the present disclosure may be made of standard plastics or other materials known in the art. In some embodiments, the materials are environmentally friendly, such as recyclable PET or polyethylene (PE). The pillows may be made of heavy gauge materials to withstand the rigors of shipping, and to have the durability for enduring many cycles of being compressed and inflated. In other embodiments, the inflatable pillows are disposable such that they do not need to be accommodated within the compressed configuration. The pillows may be configured to be inflated to a range of pressures as needed for the specific situation. For example, the pillows may be inflated to lower pressures for a softer cushioning effect on the items being shipped, or may be inflated to higher pressures for more structural rigidity of the shipping container. The dimensions and form of the pillows can be tailored to be seated properly in the specific shipping container. For example, the pillows may include features such as partially or fully rounded corners, straight edges without seams for rigidity of straight walls, and/or chamfered edges in corner regions of the shipping container.

Figure 13:
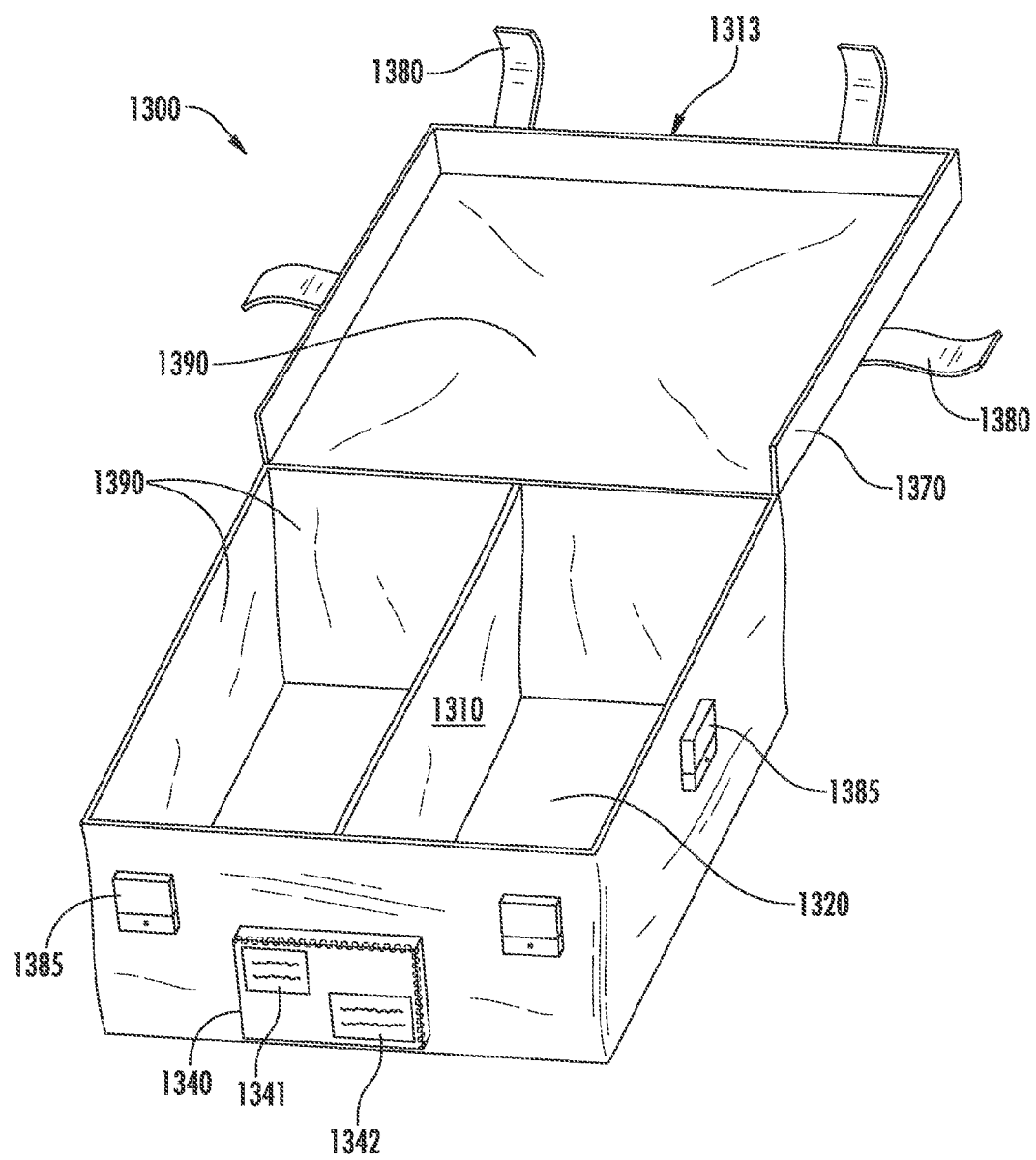
FIG. 13 illustrates a perspective view of a shipping container with a dividing wall, in accordance with some embodiments.

FIG. 13 shows yet another embodiment of a shipping container 1300 embodied as a square box, in which a dividing wall 1310 is present in the internal cavity 1320. A pouch 1340 is integrated onto the shipping container 1300 as in previous embodiments of this disclosure, such that the shipping container 1300 may be converted from its open configuration as shown in FIG. 13, into a compact form compressed inside of pouch 1340. In this embodiment, pouch 1340 has two label windows, a first window 1341 for the sender's return address, and a second window 1342 for the mailing address.

The walls of shipping container 1300 have air pillows in panels 1390, including lid wall 1313 in this embodiment. Dividing wall 1310 is configured to have an inflatable pillow secured to it, the pillow being secured, for example, by the embodiments demonstrated in FIGS. 11A-11B. In other embodiments, dividing wall 1310 may be configured as a simple partition for items being shipped, without the need for cushioning protection provided by an inflatable pillow. In various embodiments, other configurations of dividing walls are possible. For example, more than one dividing wall may be provided, or the dividing walls may intersect each other, or the dividing walls may be positioned diagonally across the shipping container. In some embodiments, the dividing wall 1310 may be removable or adjustable in its location within the shipping container 1300, such as with detachable fasteners including, but not limited to, hook-and-loop materials, buttons, snaps, strings, and the like.

The lid 1313 includes a lip 1370, which will overlap the side walls of shipping container 1300 when the lid 1313 is closed. Straps 1380 are attached to lid 1313, where straps 1380 will be secured to buckles 1385 on the body of the shipping container 1300. Thus, straps 1380 and buckles 1385 serve as the closure device for shipping container 1300 in this embodiment.

Figure 14:
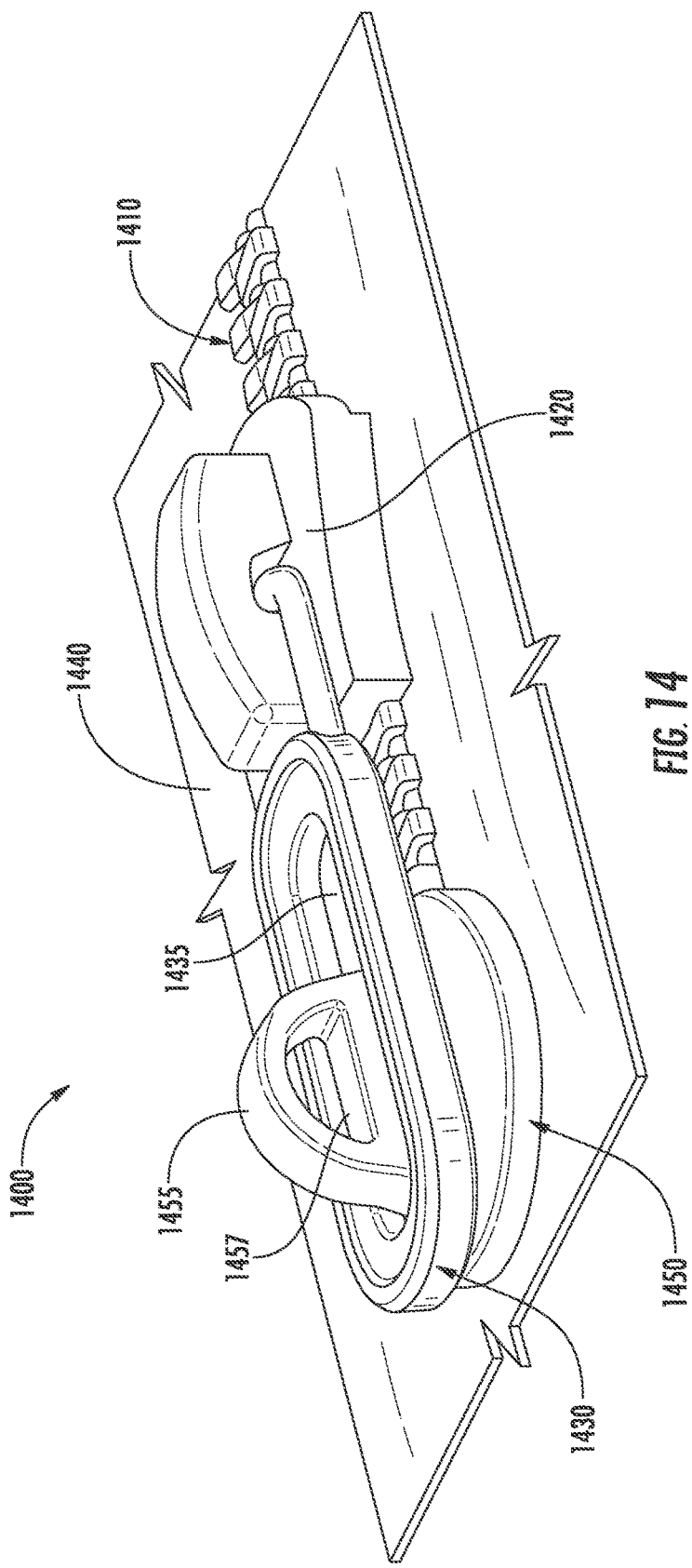
FIG. 14 illustrates an embodiment of a locking device that may be used with the shipping containers of the present disclosure.

FIG. 14 is a perspective view of another embodiment of a locking device 1400. Locking device 1400 has a zipper 1410, with a zipper head 1420 and zipper pull 1430. Zipper pull 1430 has a slot 1435, through which the head 1455 of rivet 1450 is placed in order to be locked. Rivet 1450 is, for example, a fabric rivet that is mounted to the shipping container material 1440 at the end of the closed zipper 1410. The customized head 1455 has an aperture 1457 through which a securing device may be placed to prevent an intruder from unzipping the zipper 1410. The securing device (not shown) may be, for example, a zip tie or a combination lock that is inserted through aperture 1457 and over zipper pull 1430. If using a combination lock, the sender may communicate the combination for the lock to the recipient via, for example, an email or text message.

The shipping containers of the present disclosure may also include a breach of package indicator as another security measure. The breach indicator can be placed across the zipper or other closure device for the shipping container, to show if the package has been opened by someone other than the intended recipient. Breach of package indicators can include, for example, tamper evident tapes and seals, or paper tabs that would be broken upon opening of the container.

Although the reusable shipping containers have been illustrated generally as rectangular mailing envelopes or boxes, other shapes are possible. For example, the shipping containers may be configured as bags or boxes in a variety of shapes such as cylindrical, hexagonal and triangular. The walls can be customized for shape, size, color, and graphics. To improve durability, the shipping containers may be fabricated using double-stitched seams, and materials for the shipping container may be water-resistant, such as with coatings. In some embodiments, the shipping containers may have anti-microbial treatment to maintain cleanliness of the bag over repeated usages, with air-exchange vents to help with air flow to kill bacteria.

Also, although the shipping labels have been illustrated in this disclosure as being placed on the pouch into which the shipping container is stowed in the compact state, in other embodiments the shipping labels may be placed elsewhere. For example, when the shipping container is expanded in its open state for shipping items, a mailing label can be placed anywhere on the exterior of the shipping container.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the scope of the present invention. Furthermore, those of ordinary skill in the art will appreciate that the foregoing description is by way of example only, and is not intended to limit the invention. Thus, it is intended that the present subject matter covers such modifications and variations.

What is claimed is:

1. A two-way reusable shipping container comprising:
a plurality of flexible walls, the flexible walls surrounding an internal cavity when the shipping container is in an open state;
a first closure device capable of closing the internal cavity;
a shipping label pouch located on a first wall of the plurality of flexible walls, the pouch comprising a label area configured to accommodate a shipping label, and wherein the pouch is configured to form a pocket into which the flexible walls of the shipping container are collapsed when the shipping container is in a compact state;
a second label area configured to accommodate a second shipping label; and
a second closure device coupled to the shipping label pouch, the second closure device being configured to retain the shipping container in the pocket in the compact state;
wherein the label area is visible when the shipping container is in the compact state without opening either the first closure device or the second closure device;
wherein the second label area is visible when the shipping container is in the open state without opening the first closure device; and
wherein the label area is not visible when the shipping container is in the open state.

2. The shipping container of claim 1, wherein the shipping label pouch is configured to form the pocket by inverting when the shipping container is converted between the open state and the compact state.

3. The shipping container of claim 2, wherein the pouch is integrated with a selected wall in the plurality of flexible walls.

4. The shipping container of claim 1, wherein the label area is located at a side wall of the shipping label pouch.

5. The shipping container of claim 1, wherein:
the flexible walls are configured to be collapsed such that the flexible walls are compressed together and stowed into the pocket for shipping the container itself in a compact size;
in the open state, the internal cavity provides a space to hold an object to be shipped;
in the compact state, the internal cavity is absent; and
the label area is configured to accommodate the shipping label by comprising a surface to display the shipping label.

6. The shipping container of claim 1, wherein the shipping container is one of the group consisting of an envelope, a bag, and a box.

7. The shipping container of claim 1, wherein:
the label area has an attached shipping label and the second label area has an attached return shipping label; or
the label area has the attached return shipping label and the second label area has the attached shipping label.

8. The reusable shipping container of claim 1, wherein:
the label area is configured to accommodate the shipping label by comprising a surface to display the shipping label;
the second label area is configured to accommodate the second shipping label by comprising a second surface to display the second shipping label; and
the label area and the second label area are opaque.

9. The two-way reusable shipping container of claim 1, further comprising:
a plurality of inflatable pillows, each inflatable pillow being secured to one of the flexible walls, wherein each inflatable pillow has an inflated state that provides structural rigidity to the shipping container in the open state.

10. The two-way reusable shipping container of claim 9, wherein:
when the shipping container is in the compact state, the plurality of inflatable pillows are uninflated and are collapsed into the pocket with the flexible walls of the shipping container; and
each wall in the plurality of flexible walls comprises an interior space within the wall, and each inflatable pillow in the plurality of inflatable pillows is inserted into the interior space of the wall.

11. A reusable shipping container comprising:
a plurality of flexible walls, the flexible walls surrounding an internal cavity when the shipping container is in an open state;
a shipping label pouch located on a first wall of the plurality of flexible walls, the pouch comprising a label area to accommodate a shipping label, and wherein the pouch is configured to form a pocket into which the walls of the shipping container are collapsed when the shipping container is in a compact state;
a first closure device that secures the internal cavity in the open state;
a second closure device that retains the shipping container in the pocket in the compact state; and
a second label area configures to accommodate a second shipping label;
wherein the label area is visible when the shipping container is in the compact state, without opening the second closure device;
wherein the second label area is visible when the shipping container is in the open state without opening the first closure device; and
wherein the label area is not visible when the shipping container is in the open state.

12. The reusable shipping container of claim 11, wherein the shipping label pouch is configured to form the pocket by inverting when the shipping container is converted between the open state and the compact state.

13. The reusable shipping container of claim 12, wherein the shipping label pouch is integrated with a selected wall in the plurality of flexible walls.

14. The reusable shipping container of claim 11, wherein the label area is located at a side wall of the shipping label pouch.

15. The reusable shipping container of claim 11, wherein:
the label area is configured to accommodate the shipping label by comprising a surface to display the shipping label;
the second label area is configured to accommodate the second shipping label by comprising a second surface to display the second shipping label; and
the label area and the second label area are opaque.

16. The reusable shipping container of claim 11, wherein:
the flexible walls are configured to be collapsed such that the flexible walls are compressed together and stowed into the pocket for shipping the reusable shipping container itself in a compact size;
in the open state, the internal cavity provides a space to hold an object to be shipped;

in the compact state, the internal cavity is absent; and
the label area is configured to accommodate the shipping label by comprising a surface to display the shipping label.

17. The reusable shipping container of claim 11, further comprising:
a plurality of inflatable pillows, each inflatable pillow being secured to one of the flexible walls, wherein each inflatable pillow has an inflated state that provides structural rigidity to the shipping container in the open state.

18. The reusable shipping container of claim 17, wherein:
when the shipping container is in the compact state, the plurality of inflatable pillows are uninflated and are collapsed into the pocket with the flexible walls of the shipping container; and
each wall in the plurality of flexible walls comprises an interior space within the wall, and each inflatable pillow in the plurality of inflatable pillows is inserted into the interior space of the wall.

19. A reusable shipping container comprising:
a plurality of flexible walls, the flexible walls surrounding an internal cavity when the reusable shipping container is in an open state;
a pouch located on a first wall of the plurality of flexible walls, the pouch comprising a label area having a surface to display a shipping label, the pouch configured to form a pocket into which the plurality of flexible walls are collapsed when the shipping container is in a compact state;
a closure device coupled to the pouch, the closure device being configured to retain the shipping container in the pocket in the compact state;
a second label area configured to accommodate a second shipping label; and
a second closure device coupled to the pouch, the second closure device being configured to retain the shipping container in the pocket in the compact state;
wherein the pouch inverts when the shipping container is converted between the open state and the compact state, such that interior surfaces of the pocket when the shipping container is in the open state become exterior surfaces of the pocket when the shipping container is in the compact state.

20. The reusable shipping container of claim 19, wherein:
the flexible walls are configured to be collapsed such that the flexible walls are compressed together and stowed into the pocket for shipping the reusable shipping container itself in a compact size;
in the open state, the internal cavity provides a space to hold an object to be shipped; and
in the compact state, the internal cavity is absent.

21. The reusable shipping container of claim 19, further comprising:
a plurality of inflatable pillows, each inflatable pillow being secured to one of the flexible walls, wherein each inflatable pillow has an inflated state that provides structural rigidity to the shipping container in the open state.

22. The reusable shipping container of claim 21, wherein:
when the shipping container is in the compact state, the plurality of inflatable pillows are uninflated and are collapsed into the pocket with the flexible walls of the shipping container; and
each wall in the plurality of flexible walls comprises an interior space within the wall, and each inflatable pillow in the plurality of inflatable pillows is inserted into the interior space of the wall.

\* \* \* \* \*